US008627467B2

(12) United States Patent
Levy et al.

(10) Patent No.: US 8,627,467 B2
(45) Date of Patent: Jan. 7, 2014

(54) SYSTEM AND METHOD FOR SELECTIVELY STORING WEB OBJECTS IN A CACHE MEMORY BASED ON POLICY DECISIONS

(75) Inventors: Yuval Levy, Tel Aviv (IL); Ron Talmor, San Jose, CA (US); Beni Serfaty, Tel Aviv (IL)

(73) Assignee: F5 Networks, Inc., Seattle, WA (US)

(*) Notice: Subject to any disclaimer, the term of this patent is extended or adjusted under 35 U.S.C. 154(b) by 0 days.

(21) Appl. No.: 13/277,041

(22) Filed: Oct. 19, 2011

(65) Prior Publication Data

US 2012/0185937 A1      Jul. 19, 2012

Related U.S. Application Data

(60) Provisional application No. 61/433,050, filed on Jan. 14, 2011.

(51) Int. Cl.
*H04L 29/06*          (2006.01)

(52) U.S. Cl.
USPC .............................................. 726/22; 726/11

(58) Field of Classification Search
USPC .............................................. 726/22–25, 11
See application file for complete search history.

(56) References Cited

U.S. PATENT DOCUMENTS

| 3,950,735 | A | 4/1976 | Patel |
| 4,644,532 | A | 2/1987 | George et al. |
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,299,312 | A | 3/1994 | Rocco, Jr. |
| 5,327,529 | A | 7/1994 | Fults et al. |
| 5,367,635 | A | 11/1994 | Bauer et al. |

(Continued)

FOREIGN PATENT DOCUMENTS

| EP | 0744850 A2 | 11/1996 |
| WO | WO 91/14326 | 9/1991 |

(Continued)

OTHER PUBLICATIONS

Abad, Cristina L., and Rafael I. Bonilla. "An analysis on the schemes for detecting and preventing ARP cache poisoning attacks." Distributed Computing Systems Workshops, 2007. ICDCSW'07. 27th International Conference on. IEEE, 2007.*

(Continued)

*Primary Examiner* — Kambiz Zand
*Assistant Examiner* — Michael Guirguis
(74) *Attorney, Agent, or Firm* — LeClairRyan, A Professional Corporation

(57) ABSTRACT

A system and method for selectively storing one or more web objects in a memory is disclosed. A server response is received at a network traffic management device, wherein the server response is associated with a client request sent from a client device and includes at least one web object. The server response is analyzed using a security module of the network traffic management device which determines if the at least a portion of the server response contains suspicious content in relation to one or more defined policy parameters handled by the security module. An instruction is sent from the security module to a cache module of the network traffic management device upon determining that the at least a portion of the server response contains suspicious information, wherein the cache module does not store the at least one web object upon receiving the instruction.

18 Claims, 4 Drawing Sheets

(56) References Cited

U.S. PATENT DOCUMENTS

| | | |
|---|---|---|
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 * | 1/2003 | Berstis et al. ............ 709/219 |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,624,424 B2 | 11/2009 | Morita et al. |
| 7,801,978 B1 | 9/2010 | Susai et al. |
| 8,130,650 B2 | 3/2012 | Allen, Jr. et al. |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0225485 A1 | 12/2003 | Fritz et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 * | 7/2005 | Keohane et al. ............ 711/138 |
| 2005/0187866 A1 | 8/2005 | Lee |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2007/0016662 A1 | 1/2007 | Desai et al. |
| 2007/0064661 A1 | 3/2007 | Sood et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0297551 A1 | 12/2007 | Choi |
| 2008/0034136 A1 | 2/2008 | Ulenas |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0256224 A1 | 10/2008 | Kaji et al. |
| 2008/0301760 A1 | 12/2008 | Lim |

(56) References Cited

U.S. PATENT DOCUMENTS

| | | |
|---|---|---|
| 2009/0049230 A1 | 2/2009 | Pandya |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0228956 A1 | 9/2009 | He et al. |
| 2009/0287935 A1 | 11/2009 | Aull et al. |
| 2010/0023582 A1 | 1/2010 | Pedersen et al. |
| 2010/0122091 A1 | 5/2010 | Huang et al. |
| 2010/0150154 A1 | 6/2010 | Viger et al. |
| 2010/0251330 A1 | 9/2010 | Kroeselberg et al. |
| 2010/0325277 A1 | 12/2010 | Muthiah et al. |
| 2011/0047620 A1* | 2/2011 | Mahaffey et al. ............... 726/23 |
| 2011/0066718 A1 | 3/2011 | Susai et al. |
| 2011/0173295 A1 | 7/2011 | Bakke et al. |
| 2011/0321122 A1 | 12/2011 | Mwangi et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

MacVittie, Lori, "Message-Based Load Balancing," Technical Brief, Jan. 2010, pp. 1-9, F5 Networks, Inc.

F5 Networks Inc., "Configuration Guide for Local Traffic Management," F5 Networks Inc., Jan. 2006, version 9.2.2, 406 pgs.

\* cited by examiner

SYSTEM AND METHOD FOR SELECTIVELY STORING WEB OBJECTS IN A CACHE MEMORY BASED ON POLICY DECISIONS

STATEMENT OF RELATED APPLICATION

The present application claims the benefit of priority based on United States Provisional Patent Application Ser. No. 61/433,050, filed on Jan. 14, 2011, in the name of inventors Yuval Levy, Ron Talmor and Beni Serfaty, entitled "System and Method for Preventing Policy Violations From Being Stored in a RAM Cache", all commonly owned herewith.

TECHNOLOGICAL FIELD

This technology generally relates to network communication security that integrates security inspection solutions with network traffic acceleration solutions on a same network device. In particular, the technology relates to selectively storing web objects in a RAM cache memory in a network traffic management device based on policy decisions made by the network traffic management device.

BACKGROUND

Existing firewalls utilize a memory or cache which stores web objects that are static in nature, such as pictures, audio, JavaScript and the like. This memory allows the firewall to operate more efficiently by allowing it to retrieve the stored web objects contained in server responses instead of having to repeatedly request such information from the servers in the secured network. This results in reducing network load and improving overall user experience. However, the memory and the firewall are not able to communicate with one another in an efficient manner, as will be discussed below.

What is needed is a system and method which allows the firewall to communicate with the memory and instructs the memory such that memory does not store the web objects in the server responses if it is deemed that the client request is suspicious and/or if it is determined that the policy for the user has become non-stable.

Figure 1:
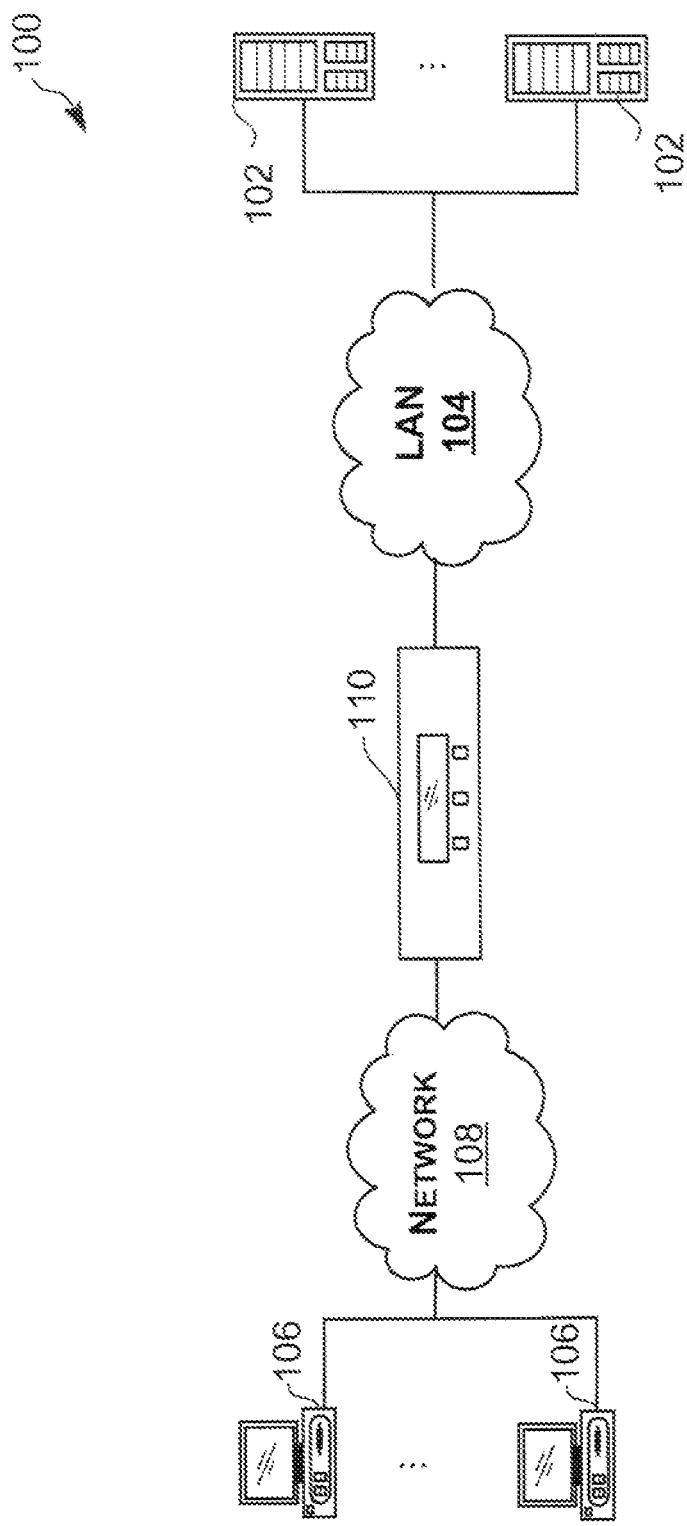
FIG. 1 is a diagram of an example system environment that includes a network traffic management device in accordance with an aspect of the present disclosure.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

SUMMARY

In an aspect, a method of selectively storing one or more web objects in a memory is disclosed. The method includes receiving a server response at a network traffic management device, wherein the server response is associated with a client request sent from a client device and includes at least one web object. The method includes analyzing the server response using a security module of the network traffic management device and determining if the at least a portion of the server response contains suspicious content in relation to one or more defined policy parameters handled by the security module. The method includes sending an instruction from the security module to a cache module of the network traffic management device upon determining that the at least a portion of the server response contains suspicious information, wherein the cache module does not store the at least one web object upon receiving the instruction.

In an aspect, a non-transitory machine readable medium having stored thereon instructions for selectively storing one or more web objects in a memory. The medium includes machine executable code which, when executed by at least one machine, causes the machine to receive a server response from a server, wherein the server response is associated with a client request sent from a client device and includes at least one web object. The machine is configured to analyze the server response and determine if at least a portion of the server response is suspicious in relation to one or more defined policy parameters. The machine is configured to send an instruction to a cache module upon determining that the at least a portion of the server response is suspicious in relation to the one or more defined policy parameters, wherein the cache module does not store the at least one web object in a memory upon receiving the instruction.

In an aspect, a network traffic management device comprises a network interface configured to receive and transmit client requests and server responses between at least one client device and at least one server over one or more networks. The network traffic management device includes a memory configured to store one or more programming instructions associated with selectively storing one or more web objects. network traffic management device includes one or more processors configured to execute the stored programming instructions, which when executed by the one or more processors, cause the one or more processors to analyze a received server response associated with a client request sent from a client device, wherein the server response includes at least one web object. The one or more processors is configured to determine if the at least a portion of the server response is suspicious in relation to one or more defined policy parameters. The one or more processors is configured to send an instruction to a cache module upon determining that the at least a portion of the server response is suspicious in relation to the one or more defined policy parameters, wherein the at least a portion of the server response is not stored in the memory as a result of the instruction.

DETAILED DESCRIPTION

FIG. 1 is a diagram of an example system environment that includes a network traffic management device in accordance with an aspect of the present disclosure. FIG. 1 illustrates an example system environment 100 which employs one or more network traffic management devices 110 capable of selectively storing web objects in a cache memory based on policy decisions made by the network traffic management device 110.

The example system environment 100 includes one or more Web and/or non Web application servers 102 (referred generally as "servers"), one or more client devices 106 and one or more network traffic management devices 110, although the environment 100 could include other numbers and types of devices in other arrangements. The network traffic management device 110 is coupled to the servers 102 via local area network (LAN) 104 and client devices 106 via a wide area network 108. Generally, client device requests are sent over the network 108 to one or more Web application servers 102 which are received or intercepted by the network traffic management device 110.

Client devices 106 comprise network computing devices capable of connecting to other network computing devices, such as network traffic management devices 110 and/or servers 102. Such connections are performed over wired and/or wireless networks, such as network 108, to send and receive data, such as for Web-based requests, receiving server responses to requests and/or performing other tasks. Non-limiting and non-exhausting examples of such client devices include personal computers (e.g., desktops, laptops), tablets, smart televisions, video game devices, mobile and/or smart phones and the like. In an example, client devices 106 can run one or more Web browsers that provide an interface for operators, such as human users, to interact with for making requests for resources to different web server-based applications and/or Web pages via the network 108, although other server resources may be requested by client devices. One or more Web-based applications may run on one or more of the servers 102 that provide the requested data back as one or more server responses to the one or more network devices.

The servers 102 comprises one or more server network devices or machines capable of operating one or more Web-based and/or non Web-based applications that may be accessed by other network devices (e.g. client devices, network traffic management devices) in the environment 100. The servers 102 can provide web objects and other data representing requested resources, such as particular Web page(s), image(s) of physical objects, JavaScript and any other objects, that are responsive to the client devices' requests. It should be noted that the servers 102 may perform other tasks and provide other types of resources. It should be noted that while only two servers 102 are shown in the environment 100 depicted in FIG. 1, other numbers and types of servers may be utilized in the environment 100.

It is also contemplated that one or more of the servers 102 may comprise a cluster of servers managed by one or more network traffic management devices 110. In one or more aspects, the servers 102 may be configured implement to execute any version of Microsoft® IIS server, RADIUS server, DIAMETER server and/or Apache® server, although other types of servers may be used. Further, additional servers may be coupled to the network 108 and many different types of applications may be available on servers coupled to the network 108.

Network 108 comprises a publicly accessible network, such as the Internet, which is connected to client devices 106. However, it is contemplated that the network 108 may comprise other types of private and public networks that include other devices. Communications, such as requests from clients 106 and responses from servers 102, take place over the network 108 according to standard network protocols, such as the HTTP, UDP and/or TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, cell towers and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, Web application servers 102 and network traffic management device 110, and the like.

LAN 104 comprises a private local area network that allows communications between the one or more network traffic management devices 110 and one or more servers 102 in the secured network. It is contemplated, however, that the LAN 104 may comprise other types of private and public networks with other devices. Networks, including local area networks, besides being understood by those skilled in the relevant arts, have already been generally described above in connection with network 108 and thus will not be described further.

As per the TCP/IP protocols, requests from the requesting client devices 106 may be sent as one or more streams of data packets over network 108 to the network traffic management device 110 and/or the servers 102. Such protocols can be utilized by the client devices 106, network traffic management device 110 and the servers 102 to establish connections, send and receive data for existing connections, and the like. It is to be understood that the one or more servers 102 may be hardware and/or software, and/or may represent a system with multiple servers that may include internal or external networks.

As shown in the example environment 100 depicted in FIG. 1, the network traffic management device 110 is interposed between client devices 106 with which it communicates with via network 108 and servers 102 in a secured network with which it communicates with via LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, via the network 108 between the client devices 106 and one or more of the servers 102. Client requests may be destined for one or more servers 102 and may take the form of one or more data packets sent over the network 108. The client requests pass through one or more intermediate network devices and/or intermediate networks, until they ultimately reach the one or more network traffic management devices 110. In any case, the network traffic management device 110 may manage the network communications by performing several network traffic related functions involving the communications. Some functions include, but are not limited to, load balancing, access control, and validating HTTP requests using JavaScript code that are sent back to requesting client devices 106.

Although examples of the server 102, the network traffic management device 110, and the client devices 106 are described and illustrated herein, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s). In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices of the system 100.

Figure 2:
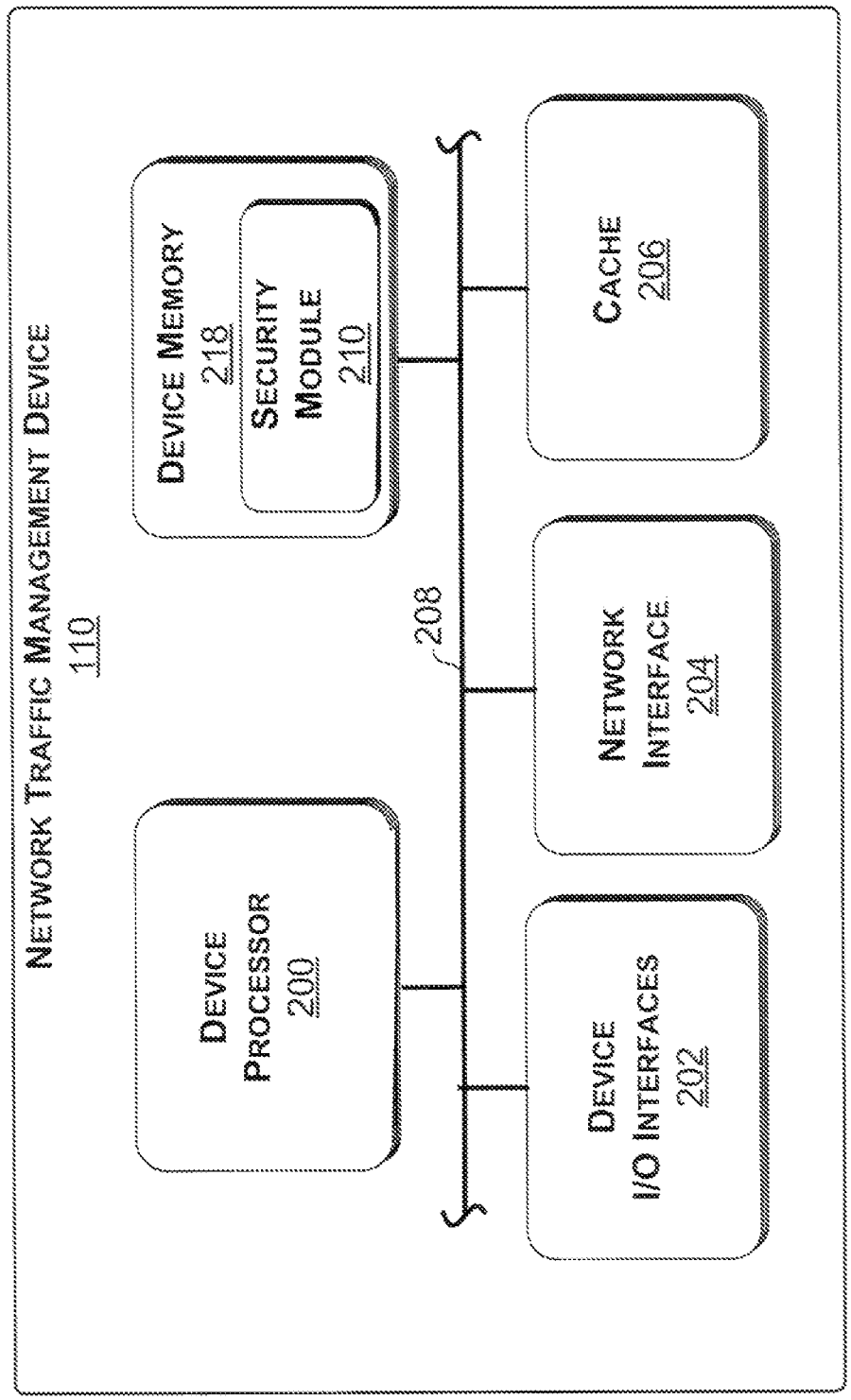
FIG. 2 is a block diagram of the network traffic management device shown in FIG. 1 in accordance with an aspect of the present disclosure.

FIG. 2 is a block diagram of the network traffic management device shown in FIG. 1 in accordance with an aspect of the present disclosure. As shown in FIG. 2, an example network traffic management device 110 includes one or more device processors 200, one or more device I/O interfaces 202, one or more network interfaces 204, and one or more device memories 218, which are coupled together by bus 208. In an aspect, the network traffic management device 110 includes one or more cache modules 206 and one or more security modules 210 that can be within the device memory 218 or outside device memory 218. It should be noted that the network traffic management device 110 can be configured to include other types and/or numbers of components and is thus not limited to the configuration shown in FIG. 2.

In an aspect, the network traffic management device 110 operates as a virtual server or proxy in the environment 100 between the requesting client devices 106 and the one or more destination servers 102. In an aspect, the network traffic management device 110 intercepts and processes requests sent from the client device 106, whereby the network traffic management device 110 is configured to transmit or forward the processed requests to the destination server 102. Similarly, responses to the client requests are sent from the server 102, whereby the network traffic management device 100 intercepts and processes the response to the client device 106 to perform the novel processes described in more detail below.

Device processor 200 of the network traffic management device 110 comprises one or more microprocessors configured to execute computer/machine readable and executable instructions stored in the device memory 218. Such instructions, when executed by one or more processors 200, implement general and specific functions of the network traffic management device 110. In addition, the instructions, when executed, implement the security module 210 to perform one or more portions of the novel processes described in more detail below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured according to the teachings as described and illustrated herein.

Device I/O interfaces 202 comprise one or more user input and output device interface mechanisms. The interface may include a computer keyboard, mouse, display device, and the corresponding physical ports and underlying supporting hardware and software to enable the network traffic management device 110 to communicate with other network devices in the environment 100. Such communications may include accepting user data input and providing user output, although other types and numbers of user input and output devices may be used. Additionally or alternatively, as will be described in connection with network interface 204 below, the network traffic management device 110 may communicate with the outside environment for certain types of operations (e.g., configuration) via one or more network management ports.

Network interface 204 comprises one or more mechanisms that enable the network traffic management device 110 to engage in network communications over the LAN 104 and the network 108 using one or more of a number of protocols, such as TCP/IP, HTTP, UDP, RADIUS and DNS. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as the LAN 104 and the network 108. In an example, where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the network traffic management device 110 or client request/server response related data.

Bus 208 may comprise one or more internal device component communication buses, links, bridges and supporting components, such as bus controllers and/or arbiters. The bus 208 enables the various components of the network traffic management device 110, such as the processor 200, device I/O interfaces 202, network interface 204, and device memory 218, to communicate with one another. However, it is contemplated that the bus 208 may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media includes computer readable/machine-executable instructions, data structures, program modules, or other data, which may be obtained and/or executed by one or more processors, such as device processor 200. Such instructions, when executed, allow or cause the processor 200 to perform actions, including implementing an operating system for controlling the general operation of network traffic management device 110 to manage network traffic, implementing the security module 210 and the cache module 206 to perform one or more portions of the process discussed below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information, which can be accessed by a computing or specially programmed device, such as the network traffic management device 110.

Security module 210 is depicted in FIG. 2 as being within memory 218 for exemplary purposes only; and it should be appreciated the module 210 may be alternatively located elsewhere. The security module 210 performs the processing and analyses of the requests/responses between the client device 106 and the server 102 to determine whether the requests/responses comply with or violate established or staging policy rules between the client device 106 and the server 102. As will be discussed in more detail below, the security module 210 communicates with the cache module 206 to ensure that the cache module 206 selectively stores web objects in server responses that are deemed by the security module 210 to comply with established policies and/or are not deemed to be suspicious.

In general, the network traffic management device 110 is configured to allow communication between the security module 210 and the cache module 206, in which the security module 210 instructs the cache module 206 when a response and/or the contents in the response (e.g. web objects) are not to be stored. In an aspect, the security module 210 processes the contents of the response received from the server 102 to determine whether the transaction, such as a request and a response violates a security policy and/or whether the response contains suspicious content or is needed for further transaction. If the security module 210 determines that the response does violate the security policy for the client device 106, contains suspicious content, needs further transactions enforcements, or its policy is not found to be stabilized yet, the security module 210 will inform the RAM cache 210 not to store the response and its contents. Some examples of actions which would violate a security policy include, but are not limited to, requests or responses that have triggered a violation (e.g. learn alarm, block staging); requests to pages that have triggered tightening suggestions (e.g. file types, URLs, and the like); the security module itself blocking a page; and pages that are within a restricted flow access. An example of a response that may be needed for further transaction enforcement is a page that has extractions configured.

In an aspect, the network traffic management device 110 may be configured to allow the cache module 206 to completely clear its memory when the security module 210 deems that the security policy should change. This may occur when the legitimacy of the entire security policy may have been compromised (e.g. the web site is changed) or other scenario. In this aspect, the network traffic management device 110 will send an in-band command to the cache module 206 which instructs the cache module 206 to clear the contents of all the previously stored web objects and other data. In an aspect, it is contemplated that the network traffic management device 110 may send an out-of-band command to the cache module 206 to instruct the cache module 206 to clear the contents of all previously stored responses and web objects.

The network traffic management device 110 may be configured such that the cache module 206 will by default automatically store each response and its contents unless the security module 210 instructs it not to store the response. It is contemplated, alternatively, that the network traffic management device 110 may be configured such that the cache module 206 will only store a response and its contents if the security module 210 instructs it to do so.

Figure 3:
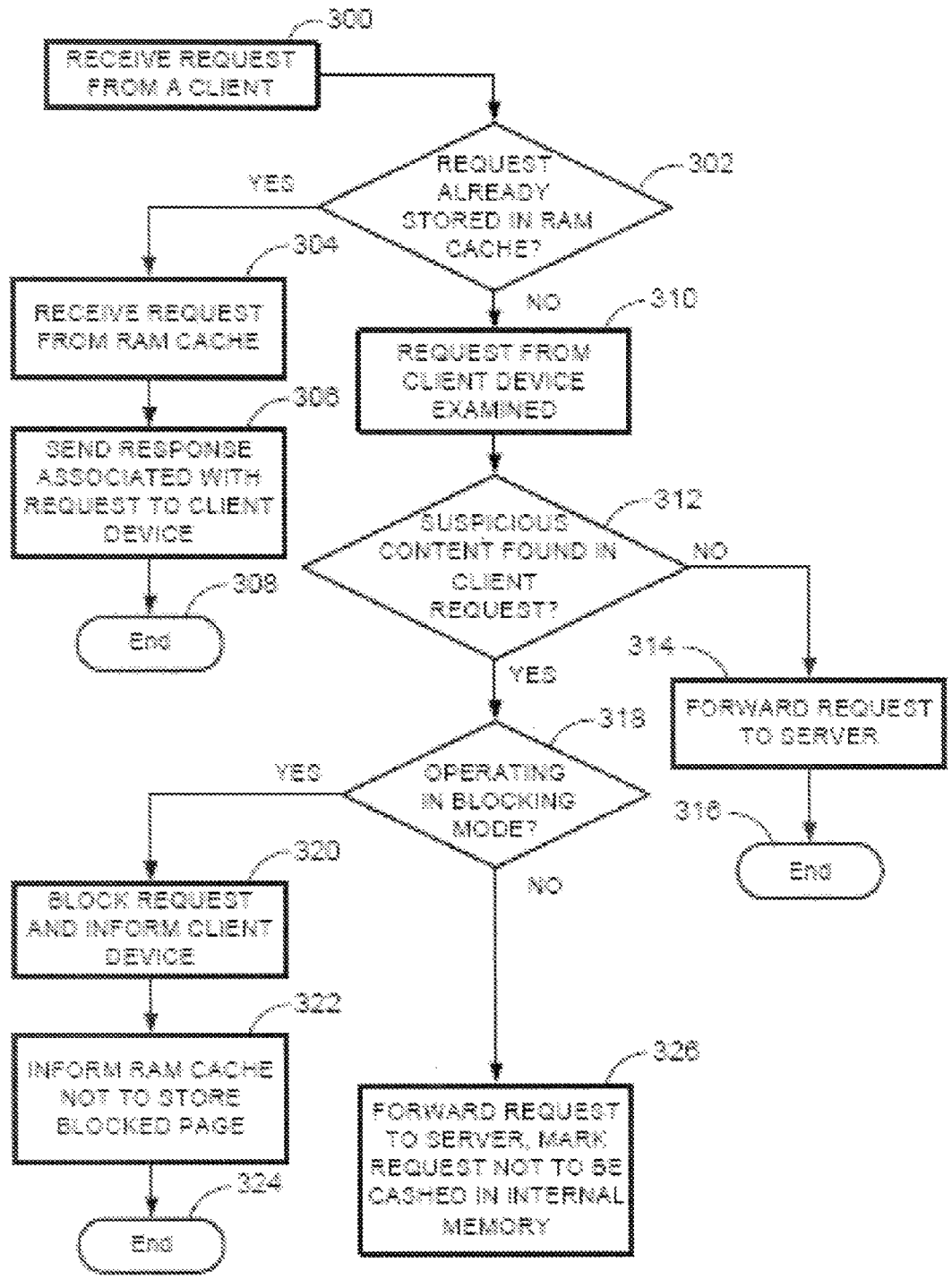
FIG. 3 is an example flow chart diagram depicting portions of a process at least partially handled by the network traffic management device in accordance with the present disclosure.

FIG. 3 illustrates an example flow chart in accordance with a process between a requesting client device and the network traffic management device 110 described in accordance with an aspect of the present disclosure. In the example, a client device 106 sends a request via the network 108 to access a web page containing one or more web objects from one or more servers 102 in the secured network. As shown in FIG. 3, the client request is received by the network traffic management device 110 (Block 300). Upon receiving the request, the network traffic management device 110 will determine whether a response containing the data (e.g. web page, web object) associated with the request is already stored in the cache module 206 of the network traffic management device 110 (Block 302). If the response is found to have been previously stored in the cache memory 206, the stored response along with the requested data is retrieved from the cache memory 206 (Block 304). The network traffic management device 110 then sends the retrieved response to the client device 106 (Block 306), whereby the process then ends until another request is received (Block 308).

Referring back to Block 302, if the network traffic management device 110 determines that the requested information is not stored in the cache module 206, the security module 210 examines and analyzes the client request (Block 310). Upon examining and analyzing the client request, the security module 210 will determine whether the request includes suspicious content (Block 312). If not, the network traffic management device 110 forwards the request to the appropriate server 102 (Block 314). As shown in FIG. 3, the process then proceeds to the steps described in FIG. 4.

In an aspect, the network traffic management device 110 will store, preferably in the memory 218, whether or not the client request contains suspicious content. As will be discussed in FIG. 4, this stored information may be used by the security module 210 in examining the server's response to determine whether the response may be legitimately sent from the server in response to a malicious request.

Returning to Block 312 in FIG. 3, in examining and analyzing the client request, if the security module 210 determines that the client request appears to include suspicious content, the security module's 210 actions will depend on whether the security module 210 is operating in a blocking mode or a non-blocking mode. If the security module 210 is operating in the blocking mode, the network traffic management device 110 will block the client request and will not transmit the request to the server 102 (Block 320). Additionally, the network traffic management device 110 will send a response message ("blocked response message") to the client device 106 informing it that the request has been blocked (Block 320). Additionally, the security module 210 will instruct the cache module 206 not to store the blocked page sent to the client device 106 (Block 322). The process then ends until another request is received (Block 324).

Referring back to Block 318, if the security module 210 is not operating in the blocking mode when examining the request, the network traffic management device 110 will forward the request to the server 102. Additionally, the network traffic management device 110 will not instruct the cache to store the request (Block 326). The process then ends until another request is received.

Figure 4:
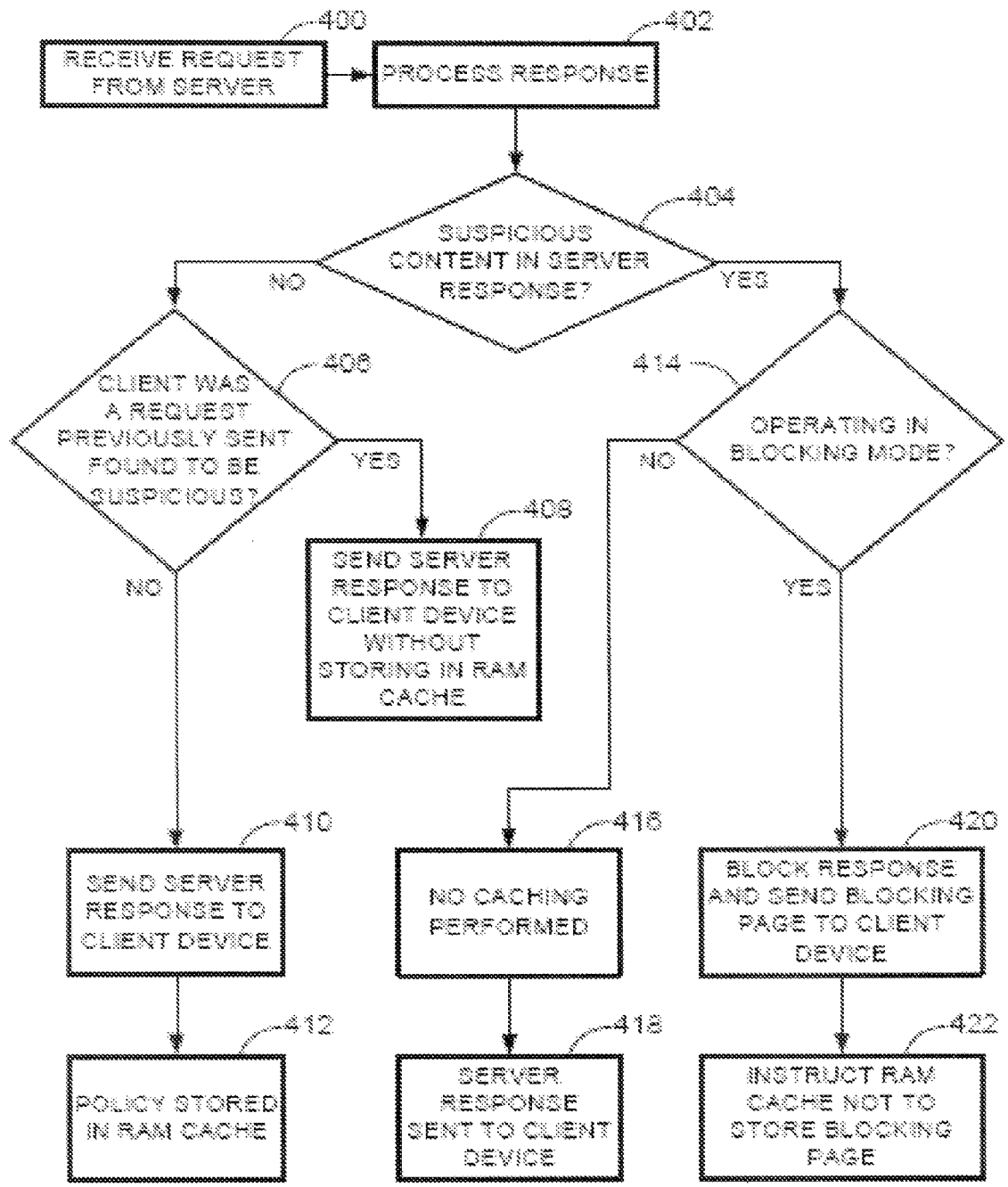
FIG. 4 is an example flow chart diagram depicting portions of a process at least handled by the network traffic management device in accordance with the present disclosure.

FIG. 4 is an example flow chart diagram depicting portions of the communication processes between the server and the client device via the network traffic management device in accordance with an aspect of the present disclosure. In particular, FIG. 4 illustrates the process which occurs after the client request has been sent from the network traffic management device 110 to the server 102 (Blocks 314, 326). The server 102, after processing the request, sends a response back to the requesting client device 106, whereby the response is received by the network traffic management device 110 (Block 400). The security module 210 of the network traffic management device 110 examines and analyzes the response (Block 402) and determines whether it includes content or web objects that may be considered suspicious per policy parameters (Block 404).

Per Block 404, if the security module 210 does not find any suspicious content in the server response, the security module 210 will check the network traffic management device's 110 internal memory 218 for information that indicates that the client device's 106 request was initially found to contain suspicious content when it was passed onto the server (Block 406). This information would have been stored by the security module 210 if the network traffic management device 110 was not operating in a blocking mode when suspicious content was found in the client's request (Block 326 in FIG. 3).

If the security module 210 finds that the originating request was found to contain suspicious content, the security module 210 will proceed with forwarding the response to the client device 106 (Block 408). However, as shown in Block 408, the security module 210 will instruct the cache module 206 not to store the response or any web objects in the response (Block 408). As mentioned above, the cache module 206 is configured to store web objects that can be quickly retrieved and sent to the client device in response to client requests for those web objects (see Blocks 302, 304, 306, 308 in FIG. 3). Thus, the network traffic management device 110 maintains security by preventing the cache module 206 from storing suspicious web objects if the originating request was found to be suspicious.

Referring back to Block 406, if the security module 210 determines that no information of the request is stored in the internal memory 218, the security module will proceed with transmitting the server's response to the client device 106 (Block 410). Additionally, the cache module 206 will automatically store the response as well as the web object(s) in the response (Block 412) since the security module 210 will have concluded that the policy rules for the request are stable and that the request and response are deemed safe per the policy parameters. The process then ends until another server response is received by the network traffic management device 110.

Referring back to Block 404, if the security module 210 determines that the server's 102 response contains suspicious content, the security module's 210 subsequent actions will depend on whether the security module 210 is operating in the blocking mode or non-blocking mode for that particular client request (Block 414). If the security module 210 is not operating in the non-blocking mode, the security module 210 instructs the cache module 206 not to store the response or any web objects in the response (Block 416) as the response is being sent to the requesting client device 106. The network traffic management device 110 will then send the server's response to the client device 106 without storing the response nor its contents in the cache module 206 (Block 418). The process then ends until another server response is received by the network traffic management device 110 (Block 426).

Referring back to Block 414 of FIG. 4, if the security module 210 is operating in a blocking mode when the response is received, the security module 210 will block the server's response by sending a blocked response page to the client device 106 (Block 420). In particular, the blocked response page informs the client device 106 that the page has been blocked and that the request cannot be honored (Block 420). Additionally, the security module 210 will instruct the cache module 206 not to store the blocked page in the manner described above (Block 422). The process then ends until another server response is received by the network traffic management device 110 (Block 428).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims.

What is claimed is:

1. A method of selectively storing one or more web objects in a memory, the method comprising:
    receiving a server response at a network traffic management device interposed between and separate from a client device and a server over a network, wherein the server response is associated with a client request sent from the client device, wherein the server response includes at least one web object;
    analyzing the server response using a security module of the network traffic management device;
    determining if the at least a portion of the server response contains suspicious content in relation to one or more defined policy parameters handled by the security module; and
    sending an instruction from the security module to a cache module of the network traffic management device upon the security module determining that the at least a portion of the server response contains suspicious information, wherein the cache module does not store the at least one web object upon receiving the instruction when the network traffic management device replies to the client device.

2. The method of claim 1, further comprising determining if the network traffic management device is operating in a blocking mode based on the at least a portion of the server response in relation to the one or more defined policy parameters.

3. The method of claim 2, further comprising sending a blocked response page to the client device upon determining the security module is operating in the blocking mode, wherein at least a portion of the block response page is not stored in the memory by the cache module.

4. The method of claim 2, further comprising: sending the server response to the client device upon determining that the network traffic management device is not operating in the blocking mode, wherein at least a portion of the server response is not stored in the memory by the cache module.

5. The method of claim 1, further comprising: inquiring in the memory if at least a portion of the client request was identified by the security module as being suspicious with respect to the one or more defined security policy parameters; sending the server response to the client device upon determining from the memory that the at least a portion of the client request was identified as being suspicious, wherein the at least a portion of the server response is not stored in the memory by the cache module.

6. The method of claim 1, wherein the at least a portion of the server response that is determined to be suspicious further comprises: analyzing the at least one web object in the server response to determine if the at least one web object is protected with respect to the one or more defined security policy parameters.

7. A non-transitory machine readable medium having stored thereon instructions for selectively storing one or more web objects in a memory, comprising machine executable code which, when executed by at least one machine of a network traffic management device, causes the machine to: receive a server response from a server at a network traffic management device interposed between and separate from the server and a client device, wherein the server response is associated with a client request sent from the client device, wherein the server response includes at least one web object; analyze the server response; determine if at least a portion of the server response is suspicious in relation to one or more defined policy parameters; and send an instruction to a cache module upon determining that the at least a portion of the server response is suspicious in relation to the one or more defined policy parameters, wherein the cache module does not store the at least one web object in a memory upon receiving the instruction when the network traffic management device replies to the client device.

8. The machine readable medium of claim 7, further comprising causing the machine to determine if the machine is operating in a blocking mode based on the at least a portion of the server response in relation to the one or more defined policy parameters.

9. The machine readable medium of claim 8, further comprising causing the machine to send a blocked response page to the client device upon determining that the machine is operating in the blocking mode, wherein at least a portion of the block response page is not stored in the memory by the cache module.

10. The machine readable medium of claim 8, further comprising causing the machine to send the server response to the client device upon determining that the machine is not operating in the blocking mode, wherein the at least a portion of the server response is not stored in the memory by the cache module.

11. The machine readable medium of claim 7, wherein the machine is further configured to: inquire in the memory if at least a portion of the client request was identified as being suspicious with respect to the one or more defined security policy parameters; send the server response to the client device upon determining from the memory that the at least a portion of the client request was identified as being suspicious, wherein the at least one web object in the server response is not stored in the memory by the cache module.

12. The machine readable medium of claim 7, wherein the at least a portion of the server response that is determined by the machine to be suspicious, the machine further configured to: analyze the at least one of the web object in the server response to determine if the at least one web object is protected with respect to the one or more defined security policy parameters.

13. A network traffic management device comprising: a network interface capable of receiving and transmitting client requests and server responses between at least one client device and at least one server over one or more networks, the network traffic management device being interposed between and separate from the at least one client device and the at least one server; a memory configured to store one or more programming instructions associated with selectively storing one or more web objects; and one or more processors configured to execute the stored programming instructions, which when executed by the one or more processors, cause the one or more processors to: analyze a received server response associated with a client request sent from a client device, wherein the server response includes at least one web object; determine if the at least a portion of the server response is suspicious in relation to one or more defined policy parameters; and send an instruction to a cache module upon determining that the at least a portion of the server response is suspicious in relation to the one or more defined policy parameters, wherein the at least a portion of the server response is not stored in the memory as a result of the instruction when the network traffic management device replies to the client device.

14. The network traffic management device of claim 13, wherein the one or more processors is configured to send a blocked response page to the client device upon determining the network traffic management device is operating in the blocking mode, wherein at least a portion of the block response page is not stored in the memory by the cache module.

15. The network traffic management device of claim 14 wherein the one or more processors is configured to send the server response to the client device upon determining that the network traffic management device is not operating in the blocking mode, wherein the at least a portion of the server response is not stored in the memory by the cache module.

16. The network traffic management device of claim 13, wherein the one or more processors is configured to determine if the network traffic management device is operating in a blocking mode based on the at least one web object and the one or more defined policy parameters.

17. The network traffic management device of claim 14, wherein the one or more processors is configured to: inquire in the memory if at least a portion of the client request was identified as being suspicious with respect to the one or more defined security policy parameters; send the server response to the client device upon determining from the memory that the at least a portion of the client request was identified as being suspicious, wherein the at least one web object in the server response is not stored in the memory by the cache module.

18. The network traffic management device of claim 13, wherein the one or more processors is configured to analyze the at least one of the web object in the server response to determine if the at least one web object is protected with respect to the one or more defined security policy parameters.

* * * * *